(12) United States Patent
LeRosen

(10) Patent No.: US 9,217,330 B1
(45) Date of Patent: Dec. 22, 2015

(54) ELECTROMAGNETIC AND AIR BEARING COMBINATION FOR TURBOCHARGER SHAFT AND WHEEL BALANCE MEASUREMENT MACHINES

(71) Applicant: BorgWarner Inc., Auburn Hills, MI (US)

(72) Inventor: Robert S. LeRosen, Candler, NC (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/599,865

(22) Filed: Jan. 19, 2015

(51) Int. Cl.
  *G01M 1/16* (2006.01)
  *G01M 1/04* (2006.01)
  *F01D 5/02* (2006.01)
  *G01M 1/14* (2006.01)

(52) U.S. Cl.
  CPC ............... F01D 5/027 (2013.01); G01M 1/14 (2013.01); *F05D 2220/40* (2013.01)

(58) Field of Classification Search
  CPC ................................ G01M 1/16; G01M 1/04
  USPC .......................................................... 73/66
  See application file for complete search history.

(56) References Cited

U.S. PATENT DOCUMENTS

| | | | |
|---|---|---|---|
| 5,076,755 A * | 12/1991 | Okada | 415/17 |
| 5,248,239 A * | 9/1993 | Andrews | 415/104 |
| 5,881,559 A * | 3/1999 | Kawamura | 60/597 |
| 6,196,809 B1 * | 3/2001 | Takahashi et al. | 417/243 |
| 7,082,763 B2 * | 8/2006 | Fremerey et al. | 60/598 |
| 2003/0038553 A1 * | 2/2003 | Andres et al. | 310/90.5 |
| 2005/0155349 A1 * | 7/2005 | Sugiura et al. | 60/605.1 |
| 2013/0230412 A1 * | 9/2013 | Alamaki et al. | 417/53 |
| 2013/0318797 A1 | 12/2013 | Royal et al. | |
| 2014/0184006 A1 * | 7/2014 | Yeom et al. | 310/156.11 |

FOREIGN PATENT DOCUMENTS

| | | | |
|---|---|---|---|
| CN | 102251887 A | * | 11/2011 |
| CN | 203161346 U | * | 8/2013 |
| DE | 102009053638 A1 | * | 5/2011 |
| JP | 2010190351 A | * | 9/2010 |
| JP | 2013083339 A | * | 5/2013 |

\* cited by examiner

*Primary Examiner* — Lisa Caputo
*Assistant Examiner* — Jamel Williams
(74) *Attorney, Agent, or Firm* — BrooksGroup

(57) ABSTRACT

A product for balancing a shaft and wheel assembly of a turbocharger is disclosed. A fixture may have an exterior surface, with an aperture extending through the exterior surface. A first conduit may extend through the fixture and may exit from the first conduit through the exterior surface. A second conduit may extend through the fixture and may exit into the aperture. A pressurized gas source may be connected to the first and second conduits. An electromagnet may be positioned in the fixture and may extend around the aperture. The pressurized gas source may be operated to apply pressurized gas through the first and second conduits and the electromagnet may be operated to apply a magnetic field to the aperture.

20 Claims, 1 Drawing Sheet

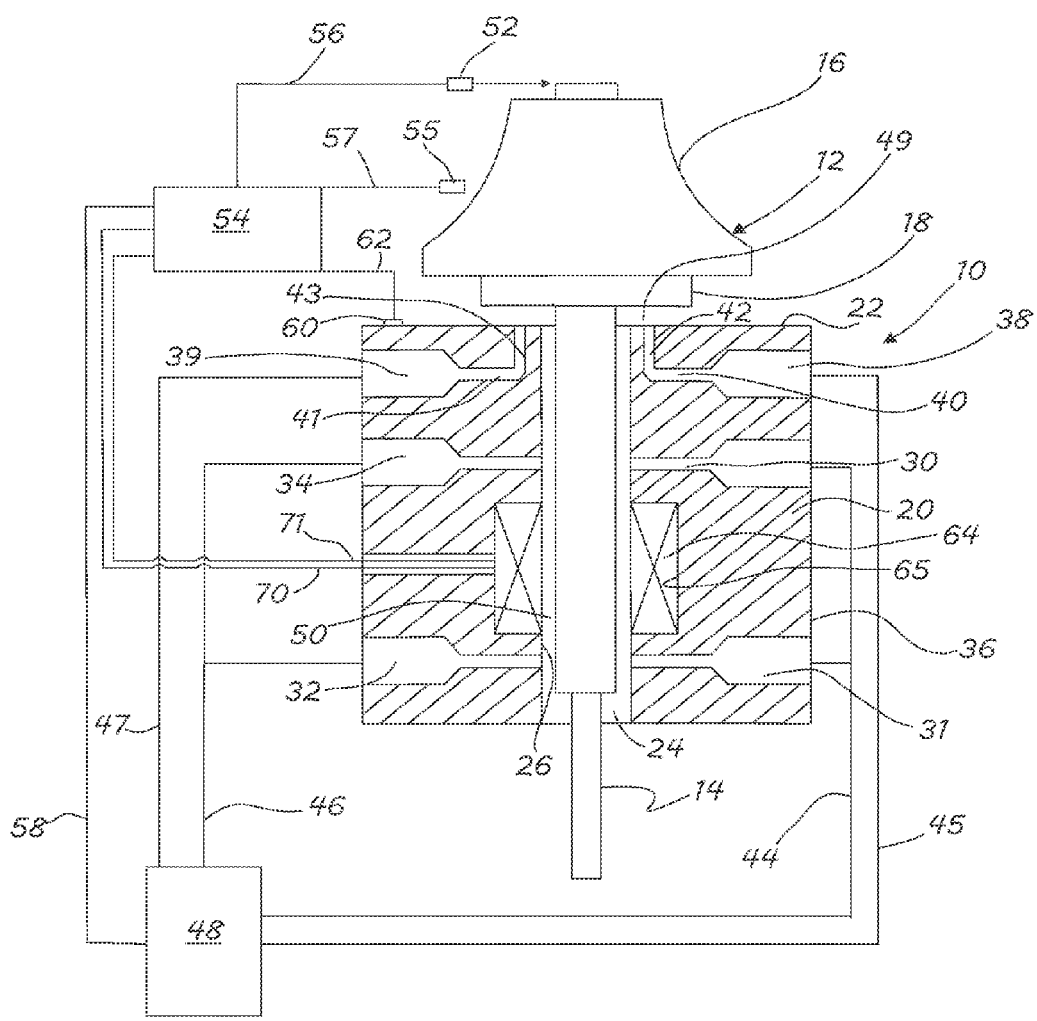

ELECTROMAGNETIC AND AIR BEARING COMBINATION FOR TURBOCHARGER SHAFT AND WHEEL BALANCE MEASUREMENT MACHINES

TECHNICAL FIELD

The field to which the disclosure generally relates includes turbocharger shaft and wheel assembly balancing.

BACKGROUND

In a turbocharger for an internal combustion engine, a turbine wheel may be rotated by exhaust gases and may be connected to a compressor wheel by a common shaft. The compressor wheel may charge intake air for the engine. The compressor wheel, the shaft and the turbine wheel may rotate at speeds that approach hundreds of thousands of revolutions per minute. In addition, the turbine wheel operates in a high temperature exhaust gas environment, wherein heat may be transferred to the other turbocharger system components. Under these harsh, and increasingly demanding operating conditions, the lifespan of a turbocharger is expected to match that of the engine with which it operates. To accomplish that challenge, the design of a turbocharger and its components must be robust to survive as expected, while still being cost effective. As a result, a turbocharger is designed to exacting tolerances and standards. In view of the involved rotational speeds, a turbocharger's shaft and wheel assembly must be precisely balanced.

SUMMARY OF ILLUSTRATIVE VARIATIONS

According to a number of variations, a product may be provided for balancing a shaft and wheel assembly of a turbocharger. A fixture may have an exterior surface, with an aperture extending through the exterior surface. A first conduit may extend through the fixture and may exit from the first conduit through the exterior surface. A second conduit may extend through the fixture and may exit into the aperture. A pressurized gas source may be connected to the first and second conduits. An electromagnet may be positioned in the fixture and may extend around the aperture. The pressurized gas source may be operated to apply pressurized gas through the first and second conduits and the electromagnet may be operated to apply a magnetic field to the aperture.

Other illustrative variations within the scope of the invention will become apparent from the detailed description provided herein. It should be understood that the detailed description and specific examples, while disclosing variations of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawing, wherein:

The FIGURE is a schematic drawing of part of a shaft and wheel balance measurement apparatus according to a number of variations.

DETAILED DESCRIPTION OF ILLUSTRATIVE VARIATIONS

The following description of the variations is merely illustrative in nature and is in no way intended to limit the scope of the invention, its application, or uses.

Referring to the FIGURE an apparatus 10 for evaluating the balance of a shaft and wheel assembly 12 is illustrated. The shaft and wheel assembly 12 may include a shaft 14 made of ferrous material and a connected wheel 16. A collar 18 may be part of the shaft and wheel assembly 12 and may be an integral part of the shaft 14. The collar 18 may be positioned at the juncture of the wheel 16 and the shaft 14. The collar 18 may have a diameter that is larger than the diameter of the shaft 14 and may operate as a thrust surface. The shaft and wheel assembly 12 may be used in a turbocharger and may require precise balancing before use.

For the shaft and wheel assembly 12, the apparatus 10 may include a fixture 20 with a surface 22. An opening designated as an aperture 24 may extend into the fixture 20 through the surface 22 that may be a top surface. The aperture 24 may be defined by a surface 26 of the fixture 20, and may present an open cylindrical shaped bore. The surface 22 that may be located at the top of the fixture 20 so that the aperture is vertically oriented. The shaft and wheel assembly 12 may be positioned with the shaft 14 extending through at least a part of the aperture 24 so that the collar is disposed above the fixture 20 and adjacent the surface 22.

The fixture 20 may include a set of bores forming conduits 30, 31, 32 and 34 that are horizontally oriented and that may extend through the fixture 20 entering at exterior surface 36 and exiting through the surface 26 into the aperture 24. The fixture may also include a set of bores that form conduits 38, 39 that include horizontal segments 40, 41 and intersecting vertical segments 42, 43. The conduits 38 and 39 may extend through the fixture 20 entering at exterior surface 36 and exiting at surface 22. The number and relative diameters of the conduits may be varied to achieve the desired performance.

The conduits 30 and 31 may be interconnected with a supply line 44, and the conduits 32 and 34 may be interconnected with a supply line 46. The conduit 38 may be interconnected with a supply line 45 and the conduit 39 may be interconnected with a supply line 47. The supply lines 44, 45, 46 and 47 may be connected with a pressurized gas supply source 48. Design of the outer surface of fixture 20, surface 36, and the mating part may form a manifold to distribute air to the conduits. To accommodate assembly, the surface 36 may be cylindrical shaped and the conduits 30-34 may be radially disposed around the aperture 24. Compressed air or other gas may be delivered by the pressurized gas supply 48 to the conduits 30-34, 38 and 39. The pressure applied to conduits 38 and 39 may be different than that applied to conduits 30-34 and may be tuned to lift the shaft and wheel assembly 12. Pressurized gas may exit the conduits 38 and 39 through the surface 22 to be directed at the collar 18 and into the space 49 to impart a lifting force to the shaft and wheel assembly 12 to separate the collar 18 from the surface 22. Pressurized gas may exit the conduits 30-34 through the surface 26 pressurizing the gap 50 between the shaft 14 and the surface 26 providing an air bearing in the space 50 so that the shaft 14 does not contact the surface 26.

A rotary device 52 may be provided to rotate the shaft and wheel assembly 12, with the shaft 14 extending into the aperture 24. The rotary device 52 may be a compressed air supply metered by a valve that may be controlled by the controller 54, or may be another device suitable to impart rotation. Air may be directed at the blades of the turbine wheel to spin the assembly. The rotary device 52, may be located in various locations to provide air flow directed at the blades of the turbine wheel. A sensor or multiple sensors 55 may be used to monitor rotational speed of the shaft and wheel assembly 12, and may be directed at the turbine blades. The sensor 55 may be connected to the controller 54 through a conductor 57.

The supply of pressurized gas into the spaces 49, 50 may provide a frictionless relationship between the shaft and wheel assembly 12 and the fixture 20. Providing separation may avoid abrasion and wear from occurring on the shaft and wheel assembly 20. The rotary device 52 may be connected to a control unit 54 by a conductor 56 to selectively rotate the shaft and wheel assembly 12. The control unit 54 may also be connected to the pressurized gas supply 48 by a conductor 58 to selectively pressurize the conduits 31-34, 38 and 39, which optionally may be provided with individual supply lines and may be controlled separately. The control unit 54 may also be connected to a sensor or sensors 60 through a conductor 62 to detect vibration imparted by the shaft and wheel assembly 12. The sensor 60 may be connected to the fixture 20 or may otherwise be positioned to sense vibrations imparted by rotation of the shaft and wheel assembly 12.

As shown in the illustrated variation, a coil 64 may be disposed in an annular cavity 65 in the fixture 20, wherein the coil 64 may be disposed around the aperture 26 so that the shaft 14 may extend through the coil 64. Alternatively, a number of individual smaller electromagnets may be placed around the aperture 26 of the fixture 20 similar to the individual air jet conduits 30-34. The size of the magnets, and number of coil windings, and wire size of each electromagnet may be designed to provide the desired force generated by the magnetic fields. In the variation illustrated, the coil 64 may be connected to the control unit 54 or to a separate driver through conductors 70, 71. The coil 64 may be selectively energized by the control unit 54 to induce a magnetic field around and into the aperture 24. The magnetic field may be induced to act on the shaft 14 to provide an electromagnetic bearing feature to center the shaft 14 in the aperture 24. The electromagnetic bearing feature may be used in combination with the air bearing feature to provide a unique level of stiffness and stability to maintain separation between the shaft and wheel assembly 12 and the fixture 20.

In a number of variations, a method may be provided wherein after the initiation of rotation of the shaft and wheel assembly 12 at a first speed range, the sensor 60 may be used to determine the extent of initial imbalance of the shaft and wheel assembly 12. Following the determination, rotation of the shaft and wheel assembly 12 may be accelerated to a second higher speed range to complete measurement of the state of imbalance. If the state of balance of the shaft and wheel assembly 12 is within a limit prior to acceleration, then the air bearing feature may be used alone. If prior to acceleration the state of balance of the shaft and wheel assembly 12 is outside a limit prior to acceleration, then the air bearing feature may be used in combination with the electromagnetic bearing feature to maintain separation between the shaft and wheel assembly 12 and the fixture 20. Once the rotation of the shaft and wheel assembly is accelerated, measurement of the state of imbalance of the shaft and wheel assembly 12 may be completed.

Through the forgoing structure, a fixture 20 may provide a method of balance testing a shaft and wheel assembly 12 that previously may have an initial state of imbalance outside the limits that conventional testing could evaluate. The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a product for balancing a shaft and wheel assembly of a turbocharger. A fixture may have an exterior surface, with an aperture extending into the fixture through the exterior surface. A first conduit may extend through the fixture with a first exit from the first conduit exiting through the exterior surface. A second conduit may extend through the fixture and may include a second exit from the second conduit opening into the aperture. A pressurized gas source may be connected to the first and second conduits. An electromagnet may be positioned in the fixture around the aperture. A control device may be interconnected with the pressurized gas source and the electromagnet. The pressurized gas source may be operated to apply pressurized gas through the first and second conduits and the electromagnet may be operated to apply a magnetic field into the aperture.

Variation 2 may include a product according to variation 1 wherein a first mode of operation may employ operation of the pressurized gas source and a second mode of operation may employ operation of both the pressurized gas source and the electromagnet.

Variation 3 may include a product according to variation 2 and may include a sensor for determining whether to operate in the first mode of operation or the second mode of operation.

Variation 4 may include a product according to any of variations 1 through 3 wherein the electromagnet may operate only when the pressurized gas source operates.

Variation 5 may include a product according to any of variations 1 through 4 wherein the aperture may extend completely through the fixture.

Variation 6 may include a product according to any of variations 1 through 5 and may include a device aligned with the shaft and wheel assembly and configured to impart rotation to the shaft and wheel assembly.

Variation 7 may include a product according to variation 6 wherein the shaft and wheel assembly may be positioned in the aperture and the device may interact with the shaft and wheel assembly to impart rotation thereto.

Variation 8 may include a product according to any of variations 1 through 7 wherein the fixture may be oriented so that the exterior surface faces in an upward direction.

Variation 9 may include a product according to variation 8 wherein the shaft and wheel assembly may include a shaft, a wheel and a collar. The collar may be located at a juncture of the shaft and the wheel. The collar may be positioned adjacent the surface and over the first exit.

Variation 10 may include a product according to any of variations 1 through 9 wherein the electromagnet may extend around the shaft.

Variation 11 may include a product for balancing a shaft and wheel assembly of a turbocharger. A fixture may be provided for rotatably supporting the shaft and wheel assembly. A first surface of the fixture may define a top of the fixture. A second surface of the fixture may define an aperture. The aperture may extend through the first surface and into the fixture. A first set of conduits may extend through the fixture and may exit through the first surface. A second set of conduits may extend through the fixture and may exit through the second surface. An electromagnet may be disposed in the fixture and may be positioned around the aperture. A pressurized gas source may be connected to the first and second conduits. The pressurized gas source may provide a pressurized gas through the first and second conduits. The electromagnet may induce a magnetic field, wherein the pressurized gas and the magnetic field may be employed to support the shaft and wheel assembly in a frictionless state.

Variation 12 may include a product according to variation 11 wherein the shaft and wheel assembly may include a shaft, a wheel and a collar. The collar may be located at a juncture of the shaft and the wheel. The collar may be positioned adjacent the first surface in line with a set of vertical segments of the first set of conduits.

Variation 13 may include a product according to variation 12 wherein the pressurized gas flow through the second set of conduits may operate to center the shaft in the aperture.

Variation 14 may include a product according to variation 13 wherein the electromagnet may extend around the shaft and may assist in centering the shaft in the aperture.

Variation 15 may include an apparatus that may include a shaft and a wheel combined into a shaft and wheel assembly. A fixture may rotatably support the shaft and wheel assembly. A first surface of the fixture may define a set of openings. A second surface of the fixture may define an aperture. The aperture may extend through the first surface and into the fixture. A first set of conduits may extend through the fixture and may exit through the first surface at the set of openings. A second set of conduits may extend through the fixture and may exit through the second surface into the aperture. An electromagnetic device may be disposed in the fixture and may extend around the aperture. A pressurized gas source may be connected to the first and second sets of conduits. The pressurized gas source may provide a pressurized gas supply through the first and second sets of conduits. The electromagnetic device may induce a magnetic field wherein the pressurized gas supply and the magnetic field may be employed to support the shaft and wheel assembly in a frictionless state. The pressurized gas supply may operate to center the shaft in the aperture. The electromagnetic device may extend around the shaft and the magnetic field and may assist in centering the shaft in the aperture.

The above description of select variations within the scope of the invention is merely illustrative in nature and, thus, variations or variants thereof are not to be regarded as a departure from the spirit and scope of the invention.

What is claimed is:

1. A product for balancing a shaft and wheel assembly of a turbocharger, the product comprising: a fixture having an exterior surface, with an aperture extending into the fixture through the exterior surface; a first conduit extending through the fixture with a first exit from the first conduit exiting the fixture through the exterior surface; a second conduit extending through the fixture, the second conduit including a second exit opening into the aperture; a pressurized gas source connected to the first and second conduits; an electromagnet positioned in the fixture around the aperture; a control device interconnected with the pressurized gas source and the electromagnet; wherein the pressurized gas source is operated to apply pressurized gas through the first and second conduits and wherein the electromagnet is operated to apply a magnetic field into the aperture.

2. The product according to claim 1 wherein a first mode of operation employs operation of the pressurized gas source and a second mode of operation employs operation of both the pressurized gas source and the electromagnet.

3. A product for balancing a shaft and wheel assembly of a turbocharger, the product comprising: a fixture having an exterior surface, with an aperture extending into the fixture through the exterior surface; a first conduit extending through the fixture with a first exit from the first conduit exiting the fixture through the exterior surface; a second conduit extending through the fixture, the second conduit including a second exit opening into the aperture; a pressurized gas source connected to the first and second conduits; an electromagnet positioned in the fixture around the aperture; a control device interconnected with the pressurized gas source and the electromagnet; wherein the pressurized gas source is operated to apply pressurized gas through the first and second conduits and wherein the electromagnet is operated to apply a magnetic field into the aperture, wherein a first mode of operation employs operation of the pressurized gas source and a second mode of operation employs operation of both the pressurized gas source and the electromagnet, and further comprising a sensor for determining whether to operate in the first mode of operation or the second mode of operation.

4. The product according to claim 2 wherein the electromagnet operates only when the pressurized gas source operates.

5. The product according to claim 1 wherein the aperture extends completely through the fixture.

6. The product according to claim 1 further comprising a device aligned with the shaft and wheel assembly, the device configured to impart rotation to the shaft and wheel assembly.

7. The product according to claim 6 wherein the shaft and wheel assembly is positioned in the aperture and the device interacts with the shaft and wheel assembly to impart rotation thereto.

8. The product according to claim 1 wherein the fixture is oriented so that the exterior surface faces in an upward direction.

9. The product according to claim 8 wherein the shaft and wheel assembly includes a shaft, a wheel and a collar, the collar located at a juncture of the shaft and the wheel, wherein the collar is positioned adjacent the surface and over the first exit.

10. The product according to claim 9 wherein the electromagnet extends around the shaft.

11. A product for balancing a shaft and wheel assembly of a turbocharger, the product comprising: a fixture for rotatably supporting the shaft and wheel assembly; a first surface of the fixture defining a top of the fixture; a second surface of the fixture defining an aperture, the aperture extending through the first surface and into the fixture; a first set of conduits extending through the fixture and exiting through the first surface; a second set of conduits extending through the fixture and exiting through the second surface; an electromagnet disposed in the fixture and positioned around the aperture; and a pressurized gas source connected to the first and second conduits; wherein the pressurized gas source provides a pressurized gas through the first and second conduits and the electromagnet induces a magnetic field; wherein the pressurized gas and the magnetic field are employed to support the shaft and wheel assembly in a frictionless state.

12. The product according to claim 11 wherein the shaft and wheel assembly includes a shaft, a wheel and a collar, the collar located at a juncture of the shaft and the wheel, wherein the collar is positioned adjacent the first surface in line with a set of vertical segments of the first set of conduits.

13. The product according to claim 12 wherein the pressurized gas flow through the second set of conduits operates to center the shaft in the aperture.

14. The product according to claim 13 wherein the electromagnet extends around the shaft and assists in centering the shaft in the aperture.

15. An apparatus comprising: a shaft and a wheel combined into a shaft and wheel assembly; a fixture rotatably supporting the shaft and wheel assembly; a first surface of the fixture defining a set of openings; a second surface of the fixture defining an aperture, the aperture extending through the first surface and into the fixture; a first set of conduits extending through the fixture and exiting through the first surface at the set of openings; a second set of conduits extending through the fixture and exiting through the second surface into the aperture; an electromagnetic device disposed in the fixture and extending around the aperture; and a pressurized gas source connected to the first and second sets of conduits; wherein the pressurized gas source provides a pressurized gas supply through the first and second sets of conduits, and the electromagnetic device induces a magnetic field; wherein the pressurized gas supply and the magnetic field are employed to support the shaft and wheel assembly in a frictionless state; wherein the pressurized gas supply operates to center the shaft in the aperture; wherein the electromagnetic device extends around the shaft, and the magnetic field assists in centering the shaft in the aperture.

16. The product according to claim 3 wherein the electromagnet is capable of operating only when the pressurized gas source operates.

17. The product according to claim 3 wherein the aperture extends completely through the fixture.

18. The product according to claim 3 further comprising a device aligned with the shaft and wheel assembly, the device configured to impart rotation to the shaft and wheel assembly.

19. The product according to claim 18 wherein the shaft and wheel assembly is positioned in the aperture and the device interacts with the shaft and wheel assembly to impart rotation thereto.

20. The product according to claim 3 wherein the electromagnet further comprises a coil disposed in an annular cavity in the fixture wherein the electromagnet is directed at the shaft to center the shaft in the aperture.

\* \* \* \* \*